United States Patent
Schmidt et al.

(12) 
(10) Patent No.: US 6,363,074 B1
(45) Date of Patent: Mar. 26, 2002

(54) METHOD AND APPARATUS FOR PROVISIONING INTER-MACHINE TRUNKS

(75) Inventors: Richard Schmidt, Merrimack, NH (US); Norman Schwartz, Hopkinton, MA (US); Vikram Shenoy, Westford, MA (US); Robert Dalias, Methuen, MA (US); Katherine L. Zebrose, Somerville, MA (US)

(73) Assignee: Unisphere Solutions, Inc., Chelmsford, MA (US)

( * ) Notice: Subject to any disclaimer, the term of this patent is extended or adjusted under 35 U.S.C. 154(b) by 0 days.

(21) Appl. No.: 09/473,862

(22) Filed: Dec. 28, 1999

Related U.S. Application Data

(60) Provisional application No. 60/114,024, filed on Dec. 29, 1998.

(51) Int. Cl.[7] .................................................. H04L 12/28
(52) U.S. Cl. ........................................ 370/397; 370/399
(58) Field of Search ................................. 370/354, 355, 370/395, 397, 399, 409, 410, 465, 466

(56) References Cited

U.S. PATENT DOCUMENTS

| | | | | |
|---|---|---|---|---|
| 5,581,600 A | * | 12/1996 | Watts et al. ................... | 379/67 |
| 5,648,958 A | * | 7/1997 | Counterman ................ | 370/458 |
| 6,002,689 A | * | 12/1999 | Christie et al. ............. | 370/401 |
| 6,028,862 A | * | 2/2000 | Russell et al. ............... | 370/397 |

OTHER PUBLICATIONS

The ATM Forum Technical Committee, "Voice and Telephony Over ATM–ATM Trunking Using AAL1 for Narrowband Services", Version 1.0 AF–VTOA–0089.000, Jul. 1997.

The ATM Forum Technical Committee, "Circuit Emulation Service Interoperability Specification", Version 2.0, af–vtoa–0078.00, Jan. 1997.

* cited by examiner

Primary Examiner—Dang Ton
Assistant Examiner—Toan Nguyen
(74) Attorney, Agent, or Firm—Weingarten, Schurgin, Gagnebin & Lebovici LLP

(57) ABSTRACT

An inter-machine trunk (IMT) is provisioned between two witches through an ATM network. The IMT includes a number of virtual connections (VCs) and cell slots within each VC for carrying telephone calls. The IMT is established by multiple repetitions of an inter-switch signaling process, each resulting in the creation of one VC. The number of VCs and cell slots for the IMT is selected based on provisioning information from a network operator. The IMT may be either a pre-established IMT ("PIMT") or an on-demand IMT ("VIMT"). A PIMT is a quasi-permanent connection set up and torn down by an operator to provide some guaranteed data-carrying capacity on the IMT. A VIMT is created automatically upon receipt of a call when no connections are available on the IMT. An IMT can use both a PIMT and a VIMT. When a call request is received at a switch, a call processor determines whether the IMT is to carry the call. If so, a VC of the IMT is selected, and a call request message identifying the called user and the selected VC and cell slot is forwarded to the remote switch. Each switch establishes a connection between the selected VC/cell slot and a respective telephony interface circuit to the calling or called party, as appropriate. The VC/cell slots are identified in both switches by Trunk Circuit Identifier Codes (TCICs) allocated when the IMT is established.

45 Claims, 5 Drawing Sheets

METHOD AND APPARATUS FOR PROVISIONING INTER-MACHINE TRUNKS

CROSS REFERENCE TO RELATED APPLICATIONS

This application claims priority under 35 U.S.C. §119(e) of U.S. provisional application No. 60/114,024 filed Dec. 29, 1998.

STATEMENT REGARDING FEDERALLY SPONSORED RESEARCH OR DEVELOPMENT

Not Applicable

BACKGROUND OF THE INVENTION

The invention is related to the field of network communications, and in particular to communications networks that route telephone calls via an Asynchronous Transmission Mode (ATM) or similar cell-based network.

There is an increasing trend toward convergence of two major activities, namely voice communication over telephone networks and data communications over data networks such as the Internet. Equipment and systems are being designed to handle both types of communications traffic, with specific pieces of the system being optimized for one or the other as necessary and other pieces being designed for both uses as necessary. Networks operating according to Asynchronous Transmission Mode (ATM) specifications are good examples of components that are tailored for use with both types of traffic. ATM is being deployed more and more extensively in large, wide-area communications networks to better handle the mixed nature of modern communications traffic.

As a result of the increasing use of ATM networks in wide-area communications network, there has been a need for equipment designed to interface with older, "legacy" telephone equipment and interfaces, on the one hand, and with an ATM network, on the other hand. For example, there is a large need for equipment that accepts the widely-used time-division-multiplexed (TDM) signals such as DS1, DS3, etc., from user equipment, and re-formats these signals to be carried as cells in an ATM network.

Traditional telephone switching equipment, much of which remains in widespread use, connects to other components in the long-distance network using "inter-machine trunks" or IMTs. An IMT is usually a TDM link such as a DS3 link, on which one or more ISDN Primary Rate Interfaces (PRIs) may be layered. Within each switch, a unique identifier is assigned for each IMT that links the switch with another switch in the network. The switch uses a Call Routing Table (CRT) to route incoming calls toward their destinations. The CRT contains a number of entries, each of which creates an association between some number of higher-order telephone number digits, such as the area code and perhaps exchange code, and the identifier for an IMT that should be used to carry calls to the destinations identified by the telephone number. For example, an entry might map the area code "617" to an identifier of a trunk that connects the switch with a switch that is along a route to Boston.

Because of the large installed base of traditional telephone switching equipment and software, there is a desire to design new equipment to be as "backward compatible" as possible, meaning that the equipment can interoperate with older equipment that uses long-existing functions and protocols, as well as with newer equipment that may use newer functions and protocols. Accordingly, there is a desire, for example, for switches and switch components that can translate between known call routing functions, such as described above, and newer networks and circuit-establishment protocols, such as are used in ATM networks.

The problem of routing voice communications over an ATM network has been addressed by the ATM Forum, an organization that coordinates ATM-related activities and promulgates specifications that describe standard ATM protocols and operations. Techniques related to "Voice and Telephony over ATM", or VTOA, are described in ATM Forum specification AF-VTOA-0089.000 entitled "Voice and Telephony over ATM—ATM Trunking Using AAL1 for Narrowband Services" (version 1.0, July 1997), and a specification AF-VTOA-0078.000 entitled "Circuit Emulation Service Interoperability Specification" (version 2.0, January 1997; generally referred to as "CES-2").

The above-referenced ATM Forum documents describe various functions used in "interworking" equipment to provide the desired voice-over-ATM operation. The general concept is to use an ATM Virtual Connection (VC) to carry multiple calls by assigning different octets of an ATM Adaptation Layer 1 (AAL1) payload to the different calls. Thus for example the first octet may be a sample from a DS0 circuit carrying call #1, the second octet a sample from a DS0 carrying call #2, etc.

One peculiarity in the ATM Forum scheme is that there is an uneven mapping from the octets of an AAL1 payload to the octets of ATM cells. That is, an AAL1 payload can be of variable size and can, in fact, span multiple ATM cells. A technique that uses a pointer embedded in certain AAL1 messages is used to identify payload boundaries. One aspect of this technique is that the octets designated to carry samples for a given telephone call change from cell to cell in a pattern that generally repeats over some number of cells, the number being determined by the size of the AAL1 payload. In general, the octets of successive AAL1 messages that carry a given call are referred to as a "cell slot". Because of the unevenness introduced by the use of AAL1, this nomenclature is somewhat misleading, because the octets for a given call do not always appear in the same octet of an ATM cell. However, the term "cell slot" is widely used, and is understood to refer to the set of octets from successive cells that carry a given call, despite the varying of the positions of the octets over successive ATM cells.

While the above-described ATM Forum techniques go far in providing a mechanism for carrying voice over an ATM network, shortcomings nonetheless exist. The above-referenced VTOA specifications do not address the problem of interfacing to legacy routing software used in existing telephone switches. Moreover, the techniques are limited in the manner in which individual telephone calls can be assigned to VCs and cell slots. It would be desirable to achieve voice-over-ATM operation in a manner that can be readily deployed with existing telephone components, such as legacy telephone routing software, and that provides maximum flexibility in order to achieve efficient and robust system performance.

BRIEF SUMMARY OF THE INVENTION

In accordance with the present invention, methods and apparatus for provisioning inter-machine trunks in a communications system that uses an ATM long-haul network are disclosed. A significant degree of backwards compatibility with existing telephone switch functions is achieved, and techniques are used that enhance efficient use of resources in the ATM network.

An inter-machine trunk (IMT) is established between two switches through a cell-based network, such as an ATM network. The IMT is configurable to carry a number of virtual connections (VCs) each capable of carrying at least one call. The number of VCs in the IMT is based on provisioning information generated by a network operator in communication with one of the switches.

When a call request is received at a telephony interface of a switch, such as at a DS3/PRI or similar trunk interface, it is first determined whether the call should be routed via the IMT. This determination is made using a call routing table that associates destination telephone numbers with trunks via which users having those telephone numbers can be reached. If the IMT is to be used, a VC of the IMT is selected to carry the call. A call request message is forwarded from the switch to a switch at the other end of the IMT. The call request message identifies the called user and the VC selected to carry the call. Each switch then establishes a connection between the selected VC of the IMT and a respective circuit of the telephony interface. For the originating switch, this is the interface circuit to the calling party; for the destination switch, it is the interface circuit to the called party. This switch-to-switch connection is then used for the telephone call.

Generally, one switch controls the establishment of the IMT by executing multiple repetitions of a signaling process with the other switch, each repetition resulting in the creation of one VC.

Each virtual connection includes a plurality of cell slots that may be allocated for carrying different calls through the cell-based network. Thus, a cell slot is also chosen, in addition to a VC, for carrying the call. The identity of the cell slot is also signaled in the call request message forwarded to the destination switch. In one embodiment, each VC/cell slot combination is uniquely associated with a corresponding Trunk Circuit Identifier Code (TCIC). A VC and cell slot are selected by selecting the associated TCIC, and the signaling is accomplished by including the TCIC in the call request message forwarded to the destination switch. Each switch then establishes a connection between the allocated VC/cell slot and the respective telephony interface circuit.

The IMT may be one of two types, either a pre-established IMT referred to as a "PIMT" or an on-demand IMT referred to as a "VIMT". A PIMT is a quasi-permanent connection that is set up and torn down by action of an operator. The PIMT provides a minimum guaranteed bandwidth or data-carrying capacity at the cost of some inefficiency. The VIMT is created automatically when a call is received and no previously-established connections are available to carry the call. The VIMT promotes efficient utilization of the ATM network, because it consumes bandwidth and VCs only when needed. In many cases, it is desirable to configure an IMT using both a PIMT and a VIMT, with connections on the PIMT being used before any connections on the VIMT are used.

The use of standard identifiers, such as TCICs, to identify IMTs in the ATM network enables the technique to be used with existing call-routing procedures in wide use. The ability to assign a call to any of several VCs, and any of several cell slots within a VC, provides desirable flexibility. Further, the use of PIMTs to guarantee available trunk bandwidth, and VIMTs to provide bandwidth on demand, enhances the efficient use of the resources of the ATM network.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
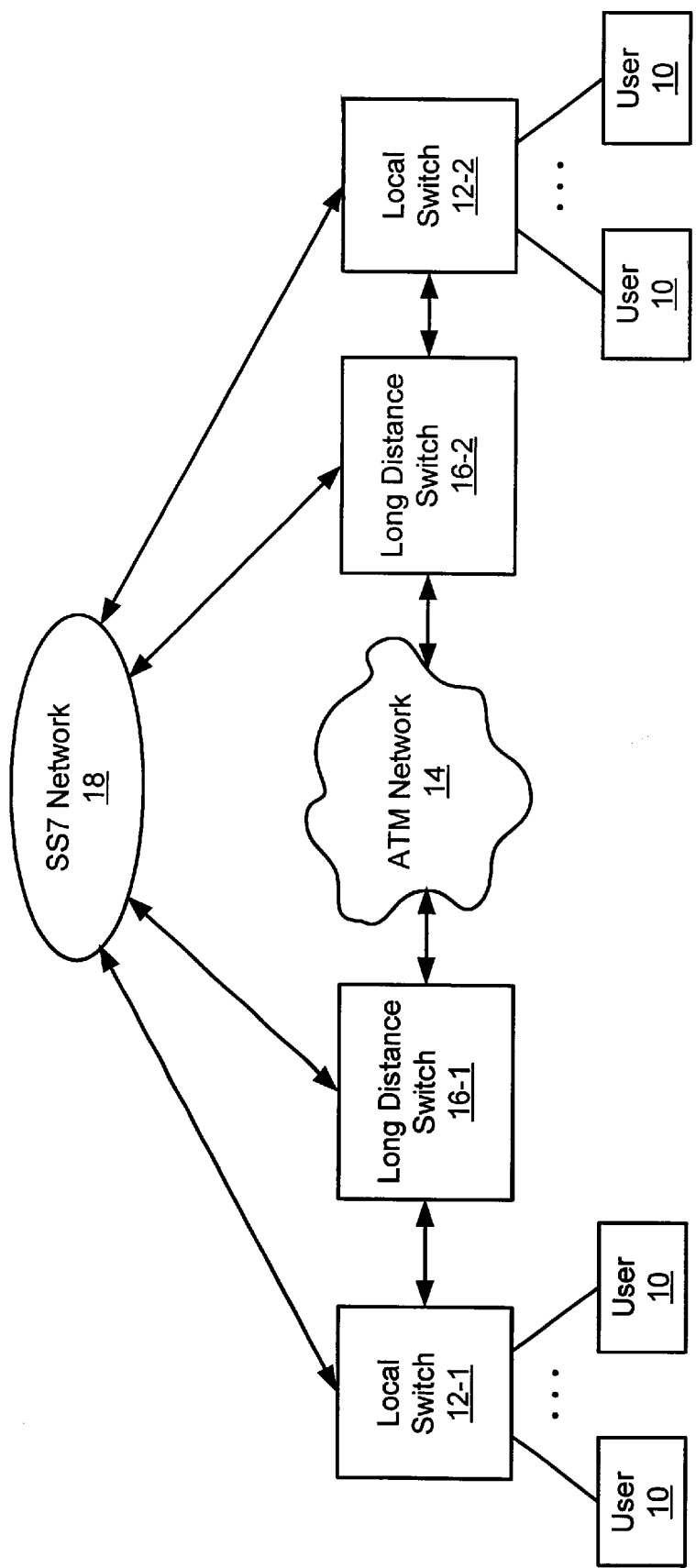
FIG. 1 is a block diagram of a communications network in accordance with the present invention.

FIG. 1 shows a communications network topology used to provide long-distance communications services. Users 10 are connected to local switches 12. Connections may be provided between users 10 via a long-haul asynchronous transfer mode (ATM) network 14. For example, a user 10 connected to local switch 12-1 may be connected to a user 10 connected to local switch 12-2 via the ATM network 14. Each local switch 12 connects to the ATM network 14 via a respective long-distance switch 16. The switches 12 and 16 are interconnected via a Signaling System 7 (SS7) network 18, which is used to provide out-of-band signaling for establishing, terminating, and managing calls placed through the ATM network 14.

Figure 2:
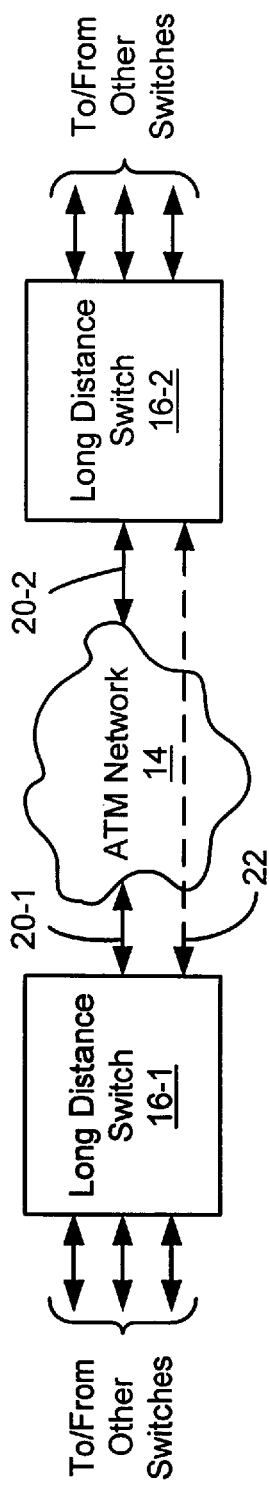
FIG. 2 is a block diagram of a portion of the communications network of FIG. 1.

As shown in FIG. 2, each long-distance switch 16 has one or more physical links 20 that connect the switch 16 to the ATM network. One type of physical link 20 that may be employed is a fiber-optic link carrying an Optical Carrier (OC) signal of a particular level. As an example, a link 20 might carry an OC-48 or OC-192 signal, having respective signaling rates of 2.488 Gb/s and 9.953 Gb/s.

Also shown in FIG. 2 is a logical link known as an inter-machine trunk (IMT) 22 extending through the ATM network 14 between the long-distance switches 16-1 and 16-2. As described in more detail below, an IMT can be established as a configuration option between two switches 16 via a network management station (NMS) (not shown) or local control console (not shown) attached to the respective switch 16. The IMT 22 may be configured to include a generally variable number of virtual connections (VCs) whose aggregate data-carrying capacity is equal to a desired data-carrying capacity for the IMT. In a preferred embodiment, this data-carrying capacity is equal to a multiple of the data-carrying capacity of a T1 communications signal, which is approximately 1.5 Mb/s. This capacity can be further expressed as a multiple of a basic communications signal known as "DS0", which is a 64-Kb/s signal widely used to carry a single analog signal such as a voice signal or modem signal in a telephone call. However, from the perspective of network operators and call routing processes used in the network, an IMT 22 is a single path connecting two long-distance switches 16 through the ATM network 14, and thus provides certain operational advantages described below.

Each long-distance switch 16 maintains a Call Route Table (not shown) that is used during the process of setting up a connection for a call. In the illustrated embodiment, certain interfaces of each switch 16 (e.g. the interfaces at the left side of switch 16-1 and at the right side of switch 16-2 in FIG. 2) use the Integrated Services Digital Network (ISDN) Primary Rate Interface (PRI) for signaling and user data delivery. These interfaces are referred to below as "generic telephony interfaces" or GTIs. When a call is placed by a user 10, it is signaled to the switch 16 using ISDN messages and protocol in the "D" channel, or signaling channel, of the PRI to which the user is assigned. From this signaling the switch 16 obtains the telephone number of the user 10 that is being called. The switch 16 consults the Call Route Table to obtain the identity of a trunk that should be used to carry the call. For example, within the switch 16-1, call requests for users 10 connected to the local switch 12-2 on the other side of the ATM network 14 are mapped to the IMT 22 by one or more entries in the Call Route Table. Generally, only a subset of the digits of the telephone number are needed for routing at this level, such as the area code and/or the 3-digit exchange code. This set of digits is referred to as the "NSA/NXX index". After the trunk has been identified, additional signaling is carried out as described below to complete the desired connection.

The IMT 22 of FIG. 2 may be either a pre-established or "permanent" IMT referred to as a "PIMT", an on-demand or "virtual" IMT referred to as a "VIMT", or a combination of the two. As is described below, the use of these two different IMT types provides flexibility that enables efficient use of network resources.

A PIMT is provisioned and established by a network operator, and generally remains established until explicitly torn down by the operator. Thus, it is a quasi-permanent connection. Data-carrying capacity (or "bandwidth") that is allocated to a PIMT remains unavailable for other uses, regardless of the amount of traffic actually flowing on the PIMT. This aspect of a PIMT ensures that some minimum capacity is always available for carrying traffic between the long-distance switches 16, but also results in inefficient use of the data-carrying capacity of the ATM network 14 when traffic between the switches 16 is light.

A VIMT is also provisioned ahead of time, but the VCs for a VIMT are established only when additional bandwidth is needed between the switches 16, and may be de-established when demand has fallen to the point that the added bandwidth is no longer needed. Thus, the VIMT provides a measure of bandwidth elasticity for the IMT 22, and results in generally more efficient use of bandwidth in the ATM network 14. By using a VIMT, a network operator can better associate costs with actual customer usage, and any associated savings can be passed on to customers.

It would be possible to construct the IMT 22 using only a PIMT, or only a VIMT. If a PIMT is used, there is the resulting inefficiency, but guaranteed availability of a certain known bandwidth. If a VIMT is used, the situation is reversed: efficiency is significantly improved, but there is no guaranteed available bandwidth. A third alternative is to use both a PIMT and a VIMT to realize the IMT 22, in order to receive the benefits of each. The PIMT is always available, providing a known guaranteed bandwidth, and is the preferred connection for routing calls. The VIMT is established when needed to meet peak traffic demand, and de-established when possible to conserve costs. A customer can over-subscribe a PIMT and yet have an acceptably low risk of calls being rejected during peak times.

When a PIMT and VIMT are used in conjunction to realize an IMT 22, then the corresponding entries in the previously-mentioned call routing table identify both the PIMT and the VIMT components. The Call Route Table is set up in such a way that an NSA-NXX index selects a row in the table where several IMT entries can reside in priority order. When a call is placed, it is assigned to a free channel on the identified PIMT, if one is available. When a long-distance switch 16 attempts to route a call based on the NSA-NXX index and determines that the PIMT is full, the VIMT is selected for the route. In a manner described in more detail below, switch 16 checks to determine whether the VIMT has been created, and if not performs a signaling process for its creation. The call is assigned to a channel on the VIMT, and the remainder of the call setup process is performed.

As indicated, for all received call requests, the PIMT is preferably checked first for available channels, and a channel on the VIMT is only used when there is no available channel on the PIMT. In this manner, the usage of the VIMT is allowed to decrease as traffic diminishes. Preferably the VIMT is automatically torn down based on some predetermined criteria of inactivity, in order to free the associated resources for allocation to other connections in the ATM network 14. For example, the VIMT may be torn down some predetermined period after the last call it has carried has ended.

As previously mentioned, it is desirable to treat the ATM IMT 22 as closely as possible to the way non-ATM IMTs are treated, from the perspective of call routing operations performed within a long-distance switch 16. To this end, the IMT 22 is made to appear as a collection of DS0 circuits, each of which is available to carry a call. In the system of FIG. 2, this operation is accomplished in part using ATM Forum Voice-Over-ATM techniques as described above, specifically using different octets of an AAL1 payload on a specified VC to carry corresponding DS0s. As mentioned above, this technique actually results in a cyclically time-varying mapping of DS0s to the octets of ATM cells carried at the ATM layer. For ease of description below, the term "cell slot" is used to refer to the octet of a cell in which an 8-bit sample for a particular DS0 can be found. It will be understood that the location of such an octet in any given ATM cell varies in a cyclical manner in accordance with Voice-Over-ATM techniques.

Another technique specified by the ATM Forum and available in the illustrated embodiment is "partial fill", in which each cell of a VC carries only one DS0. By using this technique, the latency associated with filling a cell with samples from a DS0 is substantially reduced, although at the expense of an increased cell rate. In the disclosed communications system, a related technique is used. Each cell of a VC carries samples from a specified number of different DS0s. Latency is reduced, as with partial fill, but the cell rate is not increased, because each cell is fully utilized. This technique uses a configuration parameter known as a "latency mitigation factor" (LMF), which specifies the number of different DS0s that should be carried on each VC. Thus, for example, if an LMF of 8 is specified, each cell includes 6 successive samples from each of 8 DS0s (subject to the above-referenced cyclical pattern induced by using AAL1); an LMF of 4 results in cells having 12 successive samples of 4 DS0s (also subject to AAL1-induced variations). The LMF parameter is supplied by a network operator in a manner described below.

One feature of existing telephone communications systems is the use of Trunk Circuit Identifier Codes (TCICs) to uniquely identify trunk circuits throughout the network. In a known fashion, groups of TCICs are distributed to various equipment in the network for allocation and use in assigning calls to circuits. In the illustrated communications system, each switch 16 receives a number of unique TCICs for such use. During the process of setting up a connection for a call directed to a user on the other side of the ATM network 14, a switch 16 allocates a cell slot on the IMT 22 to carry the call by selecting an unused TCIC, and signaling the selected TCIC to the remote switch 16. Each switch 16 then uses the TCIC in a manner described below to establish the connection for the call.

Figure 3:
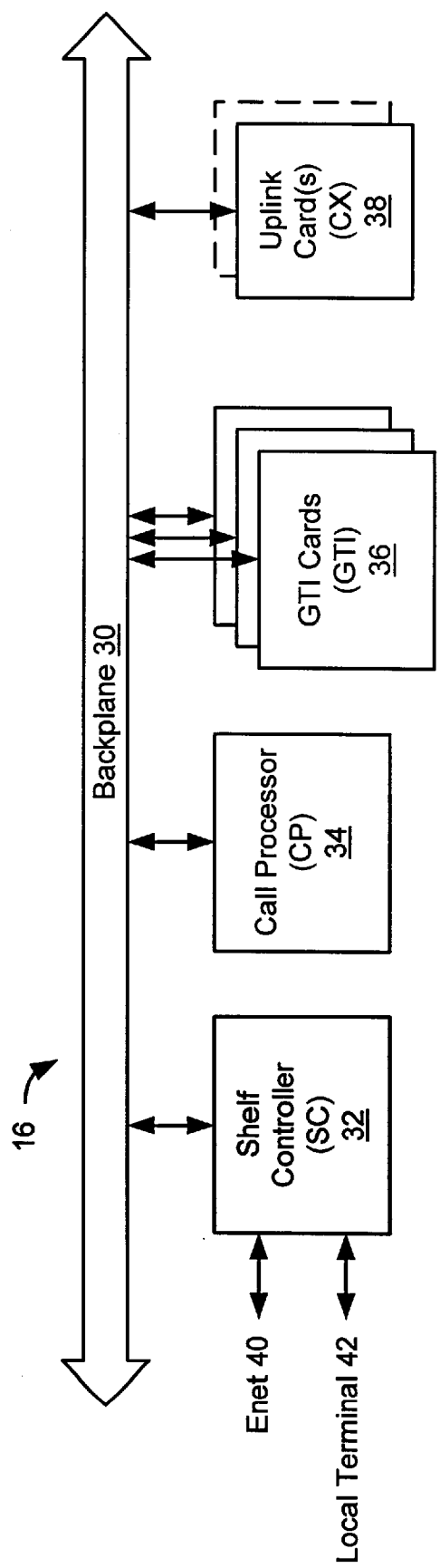
FIG. 3 is a block diagram of a long-distance switch in the communications network of FIGS. 1 and 2.

FIG. 3 shows an exemplary internal structure for a long-distance switch 16. A set of high-speed backplane connections 30 interconnects a number of circuit cards, including a shelf controller (SC) 32, a call processor (CP) 34, a number of generic telephony interface cards (GTI) 36, and one or more uplink cards (CX) 38. Each CX card 36 provides an interface to a physical link 20. Each GTI card 36 provides interfaces to trunks, such as DS3 links, that connect the long-distance switch 16 with the local switches 12 and/or other telephony equipment. More generally, the GTI cards 36 are the sources and destinations of telephone calls, some of which are routed via the IMT 22.

The CP 34 handles SS7 signaling via a separate connection (not shown) to the SS7 network 18 of FIG. 1. The CP 34 also handles call routing, including the above-described functions related to the Call Route Table, and manages the internal switching required to route call data within the switch 16. The SC 32 provides functionality for managing the switch, such as communicating with an NMS (not shown), maintaining a configuration database, managing the operation of the switch 16 at boot time, etc. The SCE 32 uses an operations and maintenance path (not shown) on the backplane 30 to communicate with the other cards in carrying out its management functions. Additionally, the SC 32 connects to an Ethernet network 40 for communicating with the NMS, and also connects to a local terminal (not shown) via a communications line 42 to enable a local operator to configure the switch 16 and to monitor and control switch operation.

Beyond the aforementioned operations and maintenance path, the backplane connections 30 consist primarily of high-speed time-division multiplexed (TDM) connections referred to as "TDM highways". In the illustrated embodiment, there are 80 such TDM highways. Each TDM highway can be configured to carry data in one direction from one card to another in the switch 16. For example, a number of TDM highways are configured to carry data from a given GTI card 36 to a CX card 38, and a generally equal number are configured to carry data in the opposite direction. Similarly, there are duplex pairs of TDM highways interconnecting different GTI cards 36, in order to route traffic that can be switched locally rather than through the ATM network 14. Each TDM highway carries a 16 Mb/s signal divided into 256 time slots, or channels, whose data rate is equal to the DS0 rate of 64 Kb/s. Because of the tremendous bandwidth of the optical link 20, 64 TDM highways terminate at a CX card 38 for carrying data to and from the GTI cards 36. The CX card 38 maps up to 8064 (32×256) backplane channel pairs to DS0 slots on the IMT 22. The processes by which the TDM channels are assigned to trunk groups and then to specific calls is described below.

Figure 4:
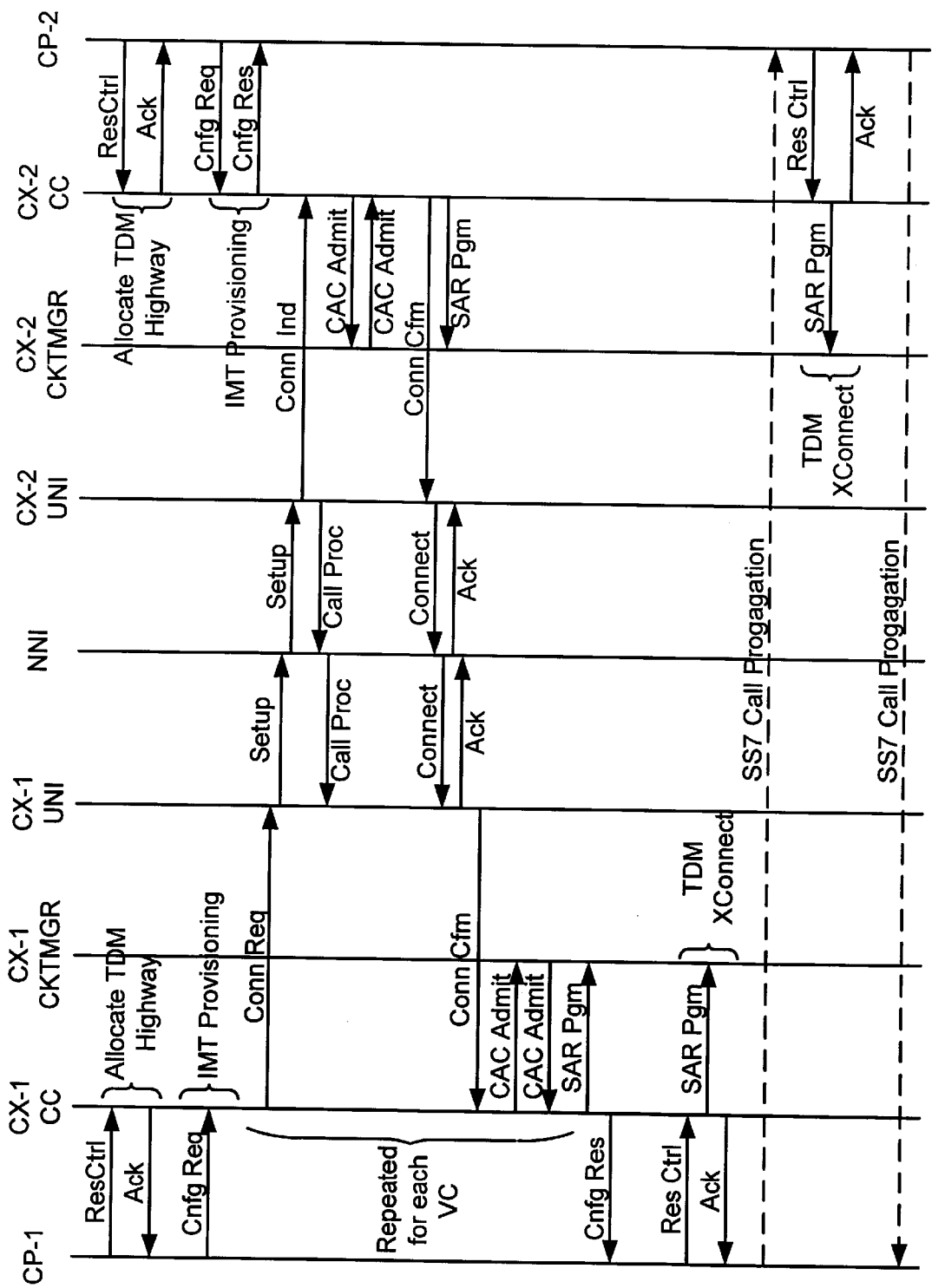
FIG. 4 is a signaling flow diagram illustrating a process by which a permanent inter-machine trunk is established between long-distance switches in the communications network of FIGS. 1 and 2.

FIG. 4 illustrates the process by which a PIMT is established between the two long-distance switches 16-1 and 16-2. In FIG. 4, time proceeds in the downward direction. In the horizontal direction, various points in the link between the two switches are designated, according to the following key:

| | |
|---|---|
| CP-1 | CP 34 of switch 16-1 |
| CX-1 CC | Call controller in CX 38 of switch 16-1 |
| CX-1 CKTMGR | Circuit manager in CX 38 of switch 16-1 |
| CX-1 UNI | ATM User-Network Interface in CX 38 of switch 16-1 |
| NNI | ATM Network-Network Jnterface within ATM network 14 (not shown in FIG. 1) |
| CX-2 UNI | ATM User-Network Interface in CX 38 of switch 16-2 |
| CX-2 CKTMGR | Circuit manager in CX 38 of switch 16-2 |
| CX-2 CC | Call controller in CX 38 of switch 16-2 |
| CP-2 | CP 34 of switch 16-2 |

The upper part of FIG. 4 shows operation during a configuration phase that precedes any call activity on the IMT 22, and the lower part shows the operations that occur when a call that requires a channel on the IMT 22 is placed. The configuration phase is initiated in response to action taken by a network operator. In the illustrated case, it is assumed that the operator has requested the configuration of a PIMT having an aggregate bandwidth equivalent to two T1s with an LMF of 24, to be established using SVCs. Call establishment proceeds as follows:

1. CP-1 issues a Resource Control (ResCtrl) message to CX-1 requesting that the CX-1 allocate TDM highways. This message is received by CX-1 CC, which then creates 8064 "logical handles", a number equal to the number of slots for DS0s on the link 20. These logical handles are mapped to corresponding time slots of 32 backplane TDM highways that will carry data from the CX-1 to the various GTI cards 36. From the perspective of CX-1, these time slots are referred to as "ingress" time slots. The handles and mapping information are returned to CP-1 in an acknowledge (ACK) message. Each handle is a 32-bit value having the following fields:

<shelf, slot, ifPort, stream, channel> where:

"shelf" identifies the physical chassis in the switch 16-1;

"slot" identifies the chassis slot occupied by the CX-1;

"ifport" identifies the port for the uplink 20;

"stream" identifies a T1-sized bundle of time slots on the uplink 20; and

"channel" identifies one of the 24 TDM time slots in the bundle identified by "stream".

In the following description, these logical handles are represented symbolically. Thus for example, the logical handle "sc01_05_01_06_01" identifies shelf 1, slot 5, port 1, stream 6, channel 1.

In a similar fashion, CP-1 and the GTI cards 36 in switch 16-1 also cooperate to create logical handles for ingress backplane time slots for the GTI cards 36. As shown in FIG. 4, the same activity also occurs at switch 16-2 during this configuration period. Each call processor CP-1 and CP-2 treats these logical handles as a pool of statically mapped backplane resources that can be used during the routing of a call, as described below.

2. An operator configures a set of objects that will make up the IMT 22 (these objects are described below). In this case, two "voice VC" objects are created, each having an LMF of 24, to yield the desired capacity of 2 T1s for the trunk. A "channel group object" (described below) is also created. These provisioning options are relayed by SC-1 (i.e., the SC 34 in switch 16-1) to CX-1 using a Configuration Request (CNFG Req) message, shown in FIG. 4 as "IMT Provisioning". This message also contains a set of TCICs (usually sequential) that will be used to identify the different "circuits", or DS0 cell slots, available on the IMT 22. The provisioning information and TCICs are also forwarded to switch 16-2, and relayed by SC-2 to CX-2. SC-2 gets this information in the same way as SC-1, either through the NMS or local terminal. When configuration is done through the NMS, the information is entered into and distributed from a single control point. When configuration is done through the local terminal, the same information must be entered at two separate control points (namely, the local terminals of the respective shelves SC-1 and SC-2). Configuration must be done on both shelves.

3. Upon receiving the provisioning information, each CX creates the desired VCs as described below, and executes a deterministic algorithm that assigns each TCIC to a corresponding cell slot of one of the VCs. This can be performed in a variety of ways. One straightforward algorithm is to assign the first TCIC in the set to the first cell slot of the first VC created, the second TCIC to the second cell slot, etc., the 25$^{th}$ TCIC to the first cell slot of the second VC, the 26$^{th}$ to the second cell slot, etc., until all the TCICs have been assigned.

4. CX-1 CC and CX-2 CC then carry out a signaling process for each VC to be created. One instance of the signaling process is shown in FIG. 4, beginning with a Connection Request (CONN Req) sent from CX-1 CC to CX-1 UNI and ending with an operation shown as "SAR PGM" between CX-1 CC and CX-1 CKTMGR. "SAR PGM" refers to the programming of a segmentation-and-reassembly (SAR) device used to transfer messages as groups of ATM cells using VC identifiers. The result of this signaling operation is the creation of the desired VCs and a mapping from a set of TCICs to the cell slots of the VCs. It should be noted that no mapping has yet been established between particular cell slots of the VCs and the backplane time slots (or channels) that have been allocated to carry data to and from CX-1 and CX-2 within the respective switch 16-1 and 16-2.

5. At this point, the network operator places one or more entries for the new PIMT in the above-mentioned Call Route Table (CRT) within CP-1. The entries in the CRT are typically indexed by the NSA/NXX index of users that can be reached via the PIMT. Each entry associates an NSA/NXX index value with the PIMT, and also with a "trunk group", i.e., the set of TCICs allocated to the PIMT.

6. When an incoming call is received at CP-1, the area code and exchange code are used to retrieve an entry from the CRT to ascertain the trunk to be used to carry the call. The general case of interest here is the receipt of a call via a GTI card 36 in switch 16-1 (referred to as "GTI-1") that is to be routed via the ATM network 14. In this case, the CRT lookup returns an identifier of the newly-created PIMT, which is known to CP-1 to be accessible via CX-1. CP-1 allocates an unused TCIC from the PIMT trunk group, if any are available, to carry the call. Based on the allocated TCIC, CP-1 also selects a GTI backplane ingress handle and a CX backplane ingress handle to allocate the corresponding backplane time slots to the call. CP-1 then creates the following Cross Connect messages (shown as "TDM XConnect" in FIG. 4) and sends them to the respective cards:

GTI XConnect (to GTI-1) : For the DS0 associated with the calling party, Write to the time slot associated with the selected GTI handle, and Read from the backplane timeslot associated with the selected CX handle.

CX XConnect (to CX-1) : For the VC cell slot associated with the selected TCIC, Write to the time slot associated with the selected CX handle, and Read from the time slot associated with the selected GTI handle.

When CX-1 receives the CX XConnect message, it uses the specified logical handle to identify a VC and the specified TCIC to identify a cell slot. Respective hardware connections are then established between send and receive circuitry for this VC/cell slot, on the one hand, and the identified backplane time slots, on the other hand. GTI-1 performs a similar operation with respect to the identified DS0 and the identified backplane time slots. The overall result is the creation of a complete path between the DS0 of the calling user on the GTI side of the switch 16-1 and a VC cell slot on the ATM network side of the switch 16-1.

7. A call setup request is propagated to switch 16-2 via the SS7 network 18. This request includes the destination telephone number, to identify the user being called, and the TCIC that has been allocated for the call, to identify the VC and cell slot on the PIMT that are to carry the call. The switch 16-2 communicates with the called user via the appropriate GTI interface to determine whether the call is to be accepted. If not, an SS7 message is returned to switch 16-1 indicating the rejection of the call. If the call is accepted, processing continues as follows.

8. The switch 16-2 then performs a cross-connecting function similar to that described above for switch 16-1. CP-2 selects backplane handles, creates GTI and CX XConnect messages including the selected handles and the TCIC received from switch 16-1, and sends these messages to CX-2 and GTI-2. CX-2 creates a duplex path between the identified backplane time slots and the VC/cell slot associated with the TCIC. Assuming that both switches 16 have correctly performed the same TCIC assignment algorithm, this VC/cell slot is the same as the one selected by the switch 16-1. GTI-2 creates a duplex path between the backplane time slots and the DS0 for the called user. At this point, a complete connection has been formed between the DS0 of the calling user at the GTI side of switch 16-1 and the DS0 of the called user at the GTI side of switch 16-2. The switch 16-2 returns an SS7 message to switch 16-1 indicating the acceptance of the call, and this indication is returned to the calling user, whereupon the calling and called users are then able to exchange content-carrying data over the new connection.

Figure 5:
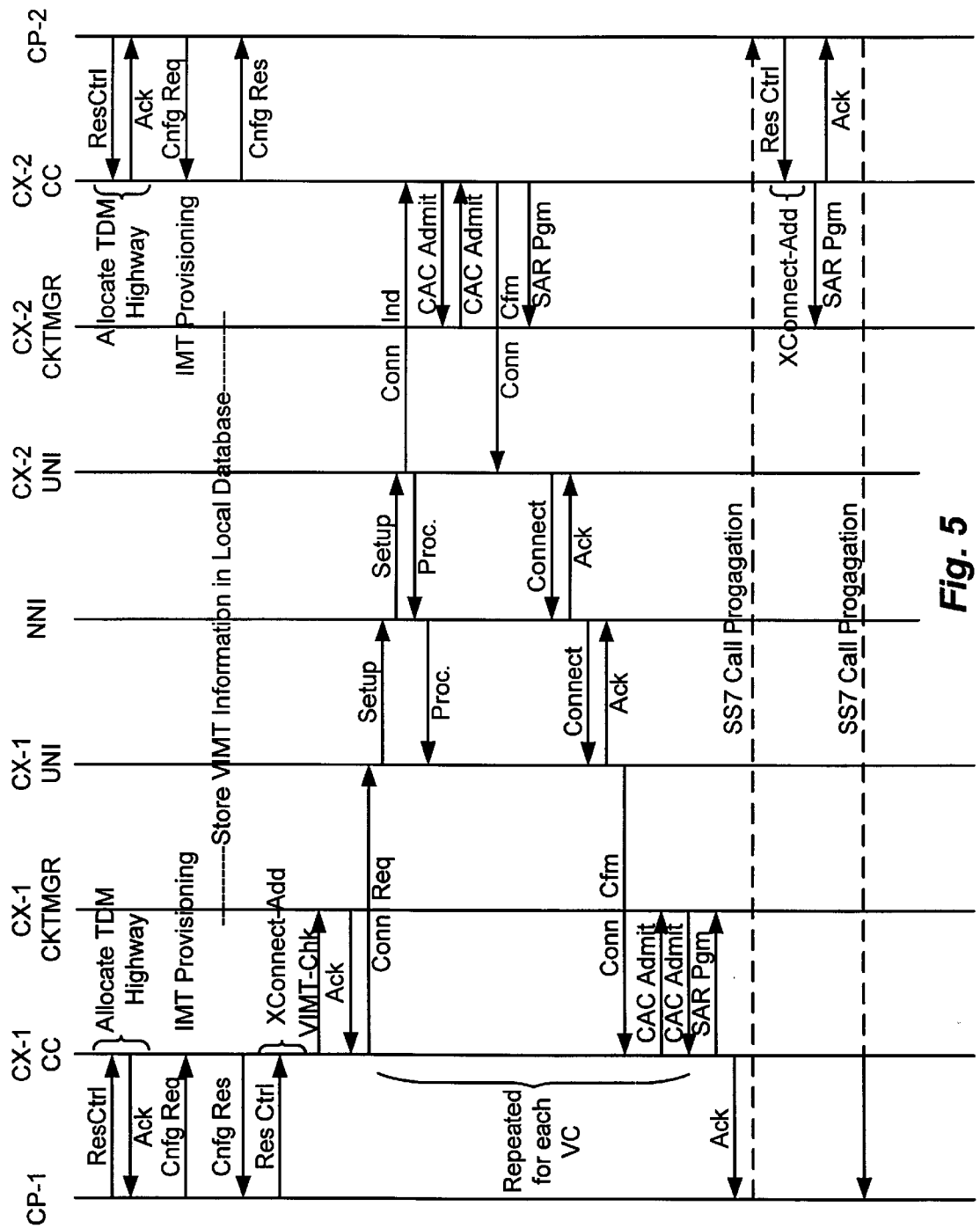
FIG. 5 is a signaling flow diagram illustrating a process by which an on-demand inter-machine trunk is established between long-distance switches in the communications network of FIGS. 1 and 2.

FIG. 5 shows the process that is performed when a VIMT is established and utilized. In many respects the process is similar to that of FIG. 4, especially the messages used for signaling and their respective sequences, and therefore the description of these items is not repeated here. The primary differences between the process of FIG. 4 and that of FIG. 5 are as follows:

1. In the process of FIG. 5, when a CX receives a CNFG Req message specifying the creation of a VIMT, the configuration information for the VIMT is simply stored in a local database; no circuits for the VIMT are created at that time.

2. At call time, when a CX receives a Res Ctrl message, the CX checks whether the VIMT has been established (shown as "VIMT-Chk" in FIG. 5). If not, it checks whether there are sufficient resources (bandwidth and VCs) on the connection to the ATM network 14 to support a new VIMT. If not, the call is rejected. If so, the CX proceeds to create the VIMT in the same manner described above for the PIMT, program the SAR to complete the connection, and perform the SS7 signaling in the same manner as described above.

Figure 6:
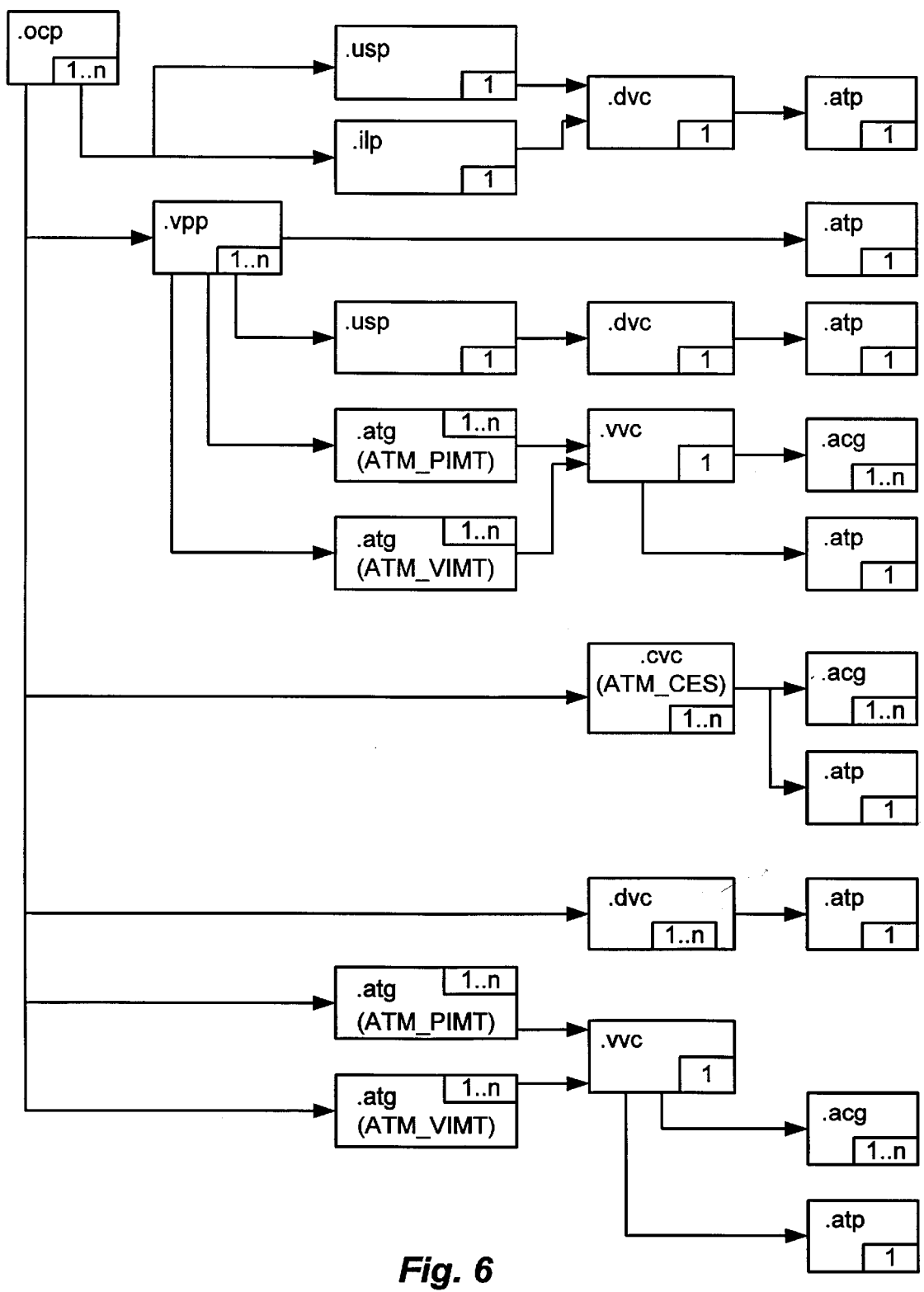
FIG. 6 is a diagram depicting a collection of interrelated data objects used in the switch of FIG. 3 for managing inter-switch communication in the network of FIGS. 1 and 2.

FIG. 6 depicts a set of programming objects, mentioned above, that are used within a CX module 38 to configure and control various IMT-related functions. The objects have a hierarchical relationship represented by arrows pointing from parent objects to child objects. It will be noted that some objects can appear at more than one level in the hierarchy. There is generally either a one-to-one or one-to-many correspondence between a parent object and associated child objects (i.e., child objects generally are not shared by multiple parents), except as noted below. The following is a list of the objects and their identifying extensions:

| Extension | Object Name |
|---|---|
| .ocp | OCx port profile |
| .usp | UNI signaling profile |
| .ilp | ILMI signaling profile |
| .vpp | Virtual Path connection profile |
| .vvc | Voice Virtual Circuit profile |
| .atp | ATM traffic profile |
| .atg | ATM Trunk Group profile |
| .acg | ATM Channel Group profile |
| .cvc | ATM Circuit Emulation Service (CES) Virtual Circuit profile |
| .dvc | Data Virtual Circuit profile |

These objects are referred to in the following description using upper-case versions of the extensions, without the initial ".". For example, the ".ocp" object is referred to as "OCP".

An OCP object is created for each physical OC port, e.g. an OC-12 or an OC-48 interface as described above. The bandwidth in the port is partitioned to provide both constant bit rate (CBR) traffic for IMTs, and variable bit rate traffic (VBR) for frame data exchange.

The OCP object may contain one instance of a UNI signaling object (USP) to communicate with the ATM network. The USP is configured for user mode and non-associated signaling. The OCP may also contain one instance of an ILMI signaling object (ILP) to communicate with an ATM switch in the ATM network 14. If an OCP object contains an ILP object, it must also contain a USP object.

Each USP object requires a permanent data virtual circuit object (DVC configured to use a PVC) to communicate with the ATM network 14. The DVC has a default VPI/VCI value of 0/5, which identifies the default "well known" signaling channel in an ATM link. The DVC, in turn, requires an ATM Traffic Profile object (ATP) to describe the traffic characteristics of the connection. Thus, a USP instance requires a DVC instance and an ATP instance. As shown, DVC objects and ATP objects are also used in conjunction with other parent objects such as VVC, CVC, etc., described below.

An ILP object requires an instance of a permanent DVC object and an associated ATP object. This DVC has a default VPI/VCI value of 0/16. There can be only one instance of an ILP object on one physical port.

An OCP object can also contain a Virtual Path connection profile (VPP) object with associated sub-objects, the collection of which is described below.

To support ATM Forum Circuit Emulation Service (CES), a CVC instance is created and a connection is established to the destination. The CVC needs an ATP instance and an ACG, which is used to identify the channels that are carried across the CES VC. The creation of a CES object is optional, at the discretion of the network administrator. A CES object is not required for proper working of a switch, and is not related to PIMTs or VIMTs.

An OCP object generally contains at least one VBR DVC that is used for inter-switch signaling. Each DVC has an associated ATP.

For each destination CX card 38 to which an interface will be created, the operator creates a PIMT Trunk Group object (PIMT ATG). As described above, in a PIMT ATG there can be many virtual connection (VVC) instances all reaching the same destination. Similarly, there can be a VIMT Trunk Group object (VIMT ATG), which likewise can have many VVC instances. A PIMT ATG can employ either permanent or switched virtual connections (PVCs or SVCs), whereas a VIMT can employ only SVCs.

The VPP object is associated with a Virtual Path connection used to provide a large bandwidth pipe between two switches 16. As shown, the VPP may use a USP for signaling. A USP object is optional; PVCs could be used instead. If VCs are to be signaled through a VPP, then a USP object is required and must be configured for associated signaling. Inside the VPP there can be one or more ATG instances. The operator allocates VP connection bandwidth among CBR applications and VBR applications.

The objects shown in FIG. 6 are created, managed, and deleted by an operator via the local terminal interface 42 of FIG. 3. The following general commands are used:

| | |
|---|---|
| ADD | Creates new object from scratch |
| COPY | Creates new object from existing object |
| SHOW | Provides statistics and configuration about an object |
| STATUS | Provides administrative and operational status information about an object |
| ASSIGN | Associates child object with a parent object |
| ENABLE | Activates an object |
| MODIFY | Modifies characteristics of an object |
| DELETE | Deletes an object |
| UNASSIGN | Dissociates child object from parent object |
| DISABLE | De-activates an object |
| RENAME | Assigns a new name to an existing object |

The detailed structure and use of many of the above objects is not germane to the present invention. However, the structure and use of the ATG, VVC, ACG and ATP objects is described in some detail below. An example follows this description to illustrate the structure and use of these objects in a system.

The ATM Trunk Group object (ATG) is used to create an IMT between two switches 16. An ATG comprises one or more VVCs that collectively carry a range of DS0s. The combination of the administrative state of an ATG and its switched VVCs reflects the ability of a given VVC to carry a call, i.e., the operational state of the VVC, as follows:

| ATG Admin. State | VVC Admin. State | Switched VVC Oper. State | Perm. VVC Oper. State |
|---|---|---|---|
| DISABLED | DISABLED | RELEASED - all established calls are torn down | BLOCKED |
| DISABLED | ENABLED | BLOCKED - Established calls unaffected, but no new call allowed | BLOCKED |
| ENABLED | DISABLED | BLOCKED - Established calls unaffected, but no new call allowed | BLOCKED |

-continued

| ATG Admin. State | VVC Admin. State | Switched VVC Oper. State | Perm. VVC Oper. State |
|---|---|---|---|
| Enabled | Enabled | If not existing, then created. Otherwise, if blocked, then unblocked | If not existing, then created. Otherwise, if blocked, then unblocked |

The following table shows parameters that are used to define ATG objects. Defaults are indicated in bold.

| Parameter | Description | Choices |
|---|---|---|
| COMMENT | Arbitrary string, useful in a manner similar to comments in programs | <string> with up to 64 characters |
| TRKGRP_ID | ATM Trunk Group (ATG) Identifier | <1–9999> |
| TYPE | Type of ATG: PIMT or VIMT. PIMT is established at configuration time and must be explicitly torn down by operator. VIMT is automatically established on demand and torn down when no longer needed. | <PIMT\|VIMT> |
| SIZE | Size of Trunk Group in DSOs | <1–4096>; default 24 |
| ISUP_TCJC | Starting ISUP TCIC for this Trunk Group. | <1–16384> |
| DEST_ATM_ADDR | Destination ATM end system address | <ATM address in AESA format> |
| DEST_SUB_ADDR | Destination sub address | <20 octets> |

The following table shows parameters that are used to define VVC objects. Defaults are indicated in bold.

| Parameter | Description | Choices |
|---|---|---|
| COMMENT | Arbitrary string, useful in a manner similar to comments in programs | <string> with up to 64 characters |
| CONN_TYPE | VC connection type: switched (SVC) or permanent (PVC) | <SVC\|PVC> |
| ACTIVE | Specifies if the local CX initiates signaling to establish connection. | <YES\|NO> |
| LMF | Latency Mitigation Factor - maximum # of calls for this VC | <1–96>; default 24 |
| VPI | VPI (for PVCs only) | <0–255> |
| VCI | VCI (for PVCs or SVCs) | <0–65,535> |

The following table shows parameters that are used to define ACG objects.

| Parameter | Description | Choices |
|---|---|---|
| COMMENT | Arbitrary string, useful in a manner similar to comments in programs | <string> with up to 64 characters |
| START | Starting offset DSO for the channel group. | <1–8064> |
| SIZE | Number of DSOs in the channel group. | <1–8064> |

The following table shows parameters that are used to define ATP objects. Defaults are indicated in bold.

| Parameter | Description | Choices |
|---|---|---|
| COMMENT | Arbitrary string, useful in a manner similar to comments in programs | <string> with up to 64 characters |
| SERVICE_CAT | Service Category of the connection, CBR or NRT_VBR Depending on the type, Descriptor_Type and QOS_Class values are determined. | <CBR, NRT_VBR> |
| PARAM1 {PARAM2, PARAM3, etc.} | Traffic parameter(s), as a function of Descriptor_Type. One typical parameter is Peak Cell Rate (PCR). For NRT_VBR service, Sustainable Cell Rate (SCR), and Max Burst Size are specified as additional parameters. | $<1-2^{31}>$ |
| CLR | Cell Loss Ratio. Should be the same for all ATP objects assigned to VVC and CVC objects. A different value should be used for ATP objects assigned to DVC objects. | <1–15> |
| CDV | Cell Delay Variation. Should be the same for all ATP objects assigned to VVC and CVC objects. A different value should be used for ATP objects assigned to DVC objects. | <125–128000 us>; default 18000 |

An example is presented to illustrate the use of the above-described objects. A PIMT is to be created between a switch in Boston and a switch in Chicago. The switch port for the ATM uplink interface is located in slot 5 of shelf 1. The PIMT will be identified in the network as trunk group #1, and will carry 48 DS0 channels using SVCs.

The requirement for 48 channels can be realized using two sets of 24 channels on separate VVCs. Such a configuration can be realized using ATG, VVC, ACG and ATP objects created in the following manner:

ADD /atg/bos_chi.atg TRKGRP_ID 1 TYPE PIMT DEST_ATM_ADDR 12345678901234567890

ADD /vvc/bos_chi_vc1.vvc COMMENT "Boston-Chicago, VC #1" CONN_TYPE SVC ACTIVE yes ADD /vvc/bos_chi_vc2.vvc COMMENT "Boston-Chicago, VC #2 " CONN_TYPE SVC ACTIVE yes ADD /acg/ds0_1_24.acg START sc01_05_01_06_01 SIZE 24

ADD /acg/ds0_25_48.acg START sc01_05_01_07_01 SIZE 24

ADD /atp/t1.atp COMMENT "Traffic Profile for a T1" SERVICE_CAT cbr PARAM1 4000

The following actions complete the configuration by linking the various objects together and enabling them:

ASSIGN /atp/t1.atp TO vvc/bos_chi_vc1.vvc

ASSIGN /atp/t1.atp TO vvc/bos_chi_vc2.vvc

ASSIGN /acg/ds0_1_24.acg TO /vvc/bos_chi_vc1.vvc

ASSIGN /acg/ds0_25_48.acg TO /vvc/bos_chi_vc2.vvc

ASSIGN /vvc/bos_chi_vc1.vvc TO /atg/bos_chi.atg
ASSIGN /vvc/bos_chi_vc2.vvc TO /atg/bos_chi.atg
ASSIGN /atg/bos_chi.atg TO /ocp/port1.ocp
ENABLE /vvc/bos_chi_vc1.vvc
ENABLE /vvc/bos_chi_vc2.vvc
ENABLE /atg/bos_chi.atg It will be noted in the above that the ATP object "t1.atp" is assigned to two VVC objects. This is possible because an ATP is a user-defined service type that can be applied to any connection, rather than an item inherently associated with a specific trunk, channel group, or VC.

Methods and apparatus for providing inter-machine trunks through a cell-based network have been described. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of establishing a connection for a call in a communications network, comprising:
    establishing an inter-machine trunk through a cell-based network between first and second network switches having respective telephony interfaces to respective sets of users, the inter-machine trunk including a plurality of virtual connections each capable of carrying at least one call through the cell-based network, each virtual connection including a plurality of cell slots respectively allocable for carrying different calls through the cell-based network, each cell slot being the location of a corresponding octet in each of a stream of cells, the number of virtual connections in the inter-machine trunk being established based on provisioning information generated by an operator communicatively coupled to at least one of the network switches;
    upon the receipt at the first switch of a call request from a calling user seeking to establish a call with a called user in the network, determining whether the call should be routed via the second switch, and if so then:
        (i) selecting, at the first switch, one of the virtual connections of the inter-machine trunk and one of the cell slots of the selected virtual connection to carry the call;
        (ii) forwarding a call request message from the first switch to the second switch, the call request message identifying the called user and the virtual connection and cell slot selected to carry the call;
        (iii) establishing, at the first switch, a connection between the selected virtual connection and cell slot and a telephony interface circuit for the calling user; and
        (iv) establishing, at the second switch, a connection between the selected virtual connection and cell slot and a telephony interface circuit for the called user.

2. A method according to claim 1, wherein the call request message forwarded to the second switch identifies the called user by including the telephone number of the called user, and identifies the virtual connection selected to carry the call by included a trunk circuit identifier code (TCIC).

3. A method according to claim 1, wherein the call request message forwarded from the first switch to the second switch identifies the selected cell slot by including a trunk circuit identifier code (TCIC).

4. A method according to claim 1, wherein establishing the inter-machine trunk comprises repeatedly executing an inter-switch signaling process initiated by one of the first and second switches, each instance of the signaling process resulting in the establishment of a respective virtual connection of the inter-machine trunk.

5. A method according to claim 4, wherein the first switch initiates the signaling process.

6. A method according to claim 1, wherein establishing the inter-machine trunk comprises repeatedly executing an inter-switch signaling process initiated by the first switch, each instance of the signaling process resulting in the establishment of a respective virtual connection of the inter-machine trunk, and wherein the network operator is coupled to the first switch to provide the provisioning information thereto.

7. A method according to claim 6, wherein the network operator is coupled to both the first switch and the second switch to provide the provisioning information thereto.

8. A method according to claim 1, wherein the call request message is forwarded from the first switch to the second switch over an out-of-band signaling network.

9. A method according to claim 1, wherein selecting one of the virtual connections comprises selecting a trunk circuit identifier code uniquely identifying the selected virtual connection in both the first and second switches, and wherein the call request message forwarded from the first switch to the second switch includes the selected trunk circuit identifier code to identify the virtual connection to be used for the call.

10. A method according to claim 1, further comprising retrieving an entry from a call routing table upon receipt of the call request at the first switch, the entry being identified by a subset of the digits of the telephone number of the called user, the entry containing an identifier of the inter-machine trunk as the trunk on which the call should be routed.

11. A method according to claim 1, further comprising selecting a type for the virtual connections of the inter-machine trunk, the type being selected from a set including permanent virtual connections and switched virtual connections.

12. A method according to claim 1, further comprising selecting a type for the inter-machine trunk prior to the establishment thereof, the type being selected from a set including a pre-established inter-machine trunk and an on-demand inter-machine trunk, and wherein the inter-machine trunk is established prior to the receipt of the call request if the pre-established inter-machine trunk type is selected, and the inter-machine trunk is established in response to the receipt of the call request if the on-demand inter-machine trunk type is selected.

13. A method according to claim 12, further comprising selecting a type for the virtual connections of the pre-established inter-machine trunk, the type being selected from a group consisting of permanent virtual connections and switched virtual connections, and wherein the virtual connections of the on-demand inter-machine trunk do not include permanent virtual connections.

14. A method according to claim 12, further comprising tearing down the on-demand inter-machine trunk upon satisfaction of a predetermined inactivity criterion.

15. A method according to claim 14, wherein the predetermined inactivity criterion is the passage of a predetermined time period after the number of calls carried by the on-demand inter-machine trunk has fallen to zero.

16. A method of establishing a connection for a call in a communications network, comprising:
    establishing an inter-machine trunk through a cell-based network between first and second network switches having respective telephony interfaces to respective sets of users, the inter-machine trunk including a plurality of virtual connections each including a plurality of cell slots respectively allocable for carrying different calls through the cell-based network, each cell slot being the location of a corresponding octet in each of a stream of cells, the number of virtual connections and cell slots in the inter-machine trunk being established based on provisioning information generated by an operator communicatively coupled to at least one of the network switches;

upon the receipt at the first switch of a call request from a calling user seeking to establish a call with a called user in the network, determining whether the call should be routed via the inter-machine trunk, and if so then:
  (i) selecting, at the first switch, one of the virtual connections of the inter-machine trunk and a cell slot of the selected virtual connection to carry the call;
  (ii) forwarding a call request message from the first switch to the second switch, the call request message identifying the called user and the virtual connection and cell slot selected to carry the call;
  (iii) establishing, at the first switch, a connection between the selected virtual connection and cell slot and a telephony interface circuit for the calling user; and
  (iv) establishing, at the second switch, a connection between the selected virtual connection and cell slot and a telephony interface circuit for the called user.

17. A method according to claim 16 wherein the call request message forwarded to the second switch identifies the called user by including the telephone number of the called user, and identifies the virtual connection and cell slot selected to carry the call by included a trunk circuit identifier code (TCIC).

18. A method according to claim 16, wherein the number of different calls that can be carried by the cell slots of each virtual connection is variable, and wherein establishing the inter-machine trunk includes configuring the virtual connections to carry a number of calls specified by the provisioning information generated by the network operator.

19. A method according to claim 18, wherein the number of different calls to be carried by each virtual connection is equal to a latency mitigation factor included in the provisioning information for the inter-machine trunk.

20. A method according to claim 19, wherein the latency mitigation factor can take on any of a set of integer values including the value "1".

21. A method according to claim 16, wherein the number of different telephony interface circuits for which each virtual connection carries calls is a selectable value between one and a predetermined maximum number greater than one, and wherein each cell of each virtual connection is sent through the cell-based network only upon becoming filled with samples from all telephony interface circuits for which the virtual connection carries calls.

22. A method according to claim 16, wherein the connection established in each switch between the selected virtual circuit and cell slot and the local telephony interface includes an adaptation function, the adaptation function employing a data structure having data units that do not map one-to-one with data units of a cell, such that the location of a cell slot for a given call in each cell varies in a cyclical pattern over a predetermined number of cells.

23. A method according to claim 16, wherein establishing the connection in each switch between the selected virtual connection and cell slot and the respective telephony interface comprises allocating time slots of time-division-multiplexed signals within the respective switch for use with the call, and creating connections within each switch between the virtual connection and cell slot and the allocated time slots.

24. A method according to claim 23, further comprising creating, in each switch, a set of logical handles for the respective time slots of the time-division-multiplexed signals, each logical handle uniquely identifying a corresponding time slot and associating the time slot with a corresponding interface of the switch, and wherein allocating time slots for the call comprises selecting logical handles from the set of logical handles, each selected logical handle identifying a corresponding time slot to be used for the call.

25. A switch for use in a communications network including a cell-based network, comprising:
  a call processor;
  a telephony interface card having a plurality of telephony interfaces to respective users; and
  an uplink interface card having an interface to the cell-based network, the uplink interface card being configurably connected to the telephony interface card via a plurality of time-division-multiplexed signals, each time-division-multiplexed signal being divided into a corresponding plurality of time slots separately allocable for carrying different calls between the telephony interface card and the uplink card;
wherein:
  (1) the call processor and uplink interface cards are cooperatively operative to establish an inter-machine trunk connecting the switch with another switch through the cell-based network, the inter-machine trunk including a plurality of virtual connections each capable of carrying at least one call, the number of virtual connections in the inter-machine trunk being established based on provisioning information generated by an operator communicatively coupled to the switch; and
  (2) the call processor, telephony interface card, and uplink interface cards are cooperatively operative, upon the receipt at the switch of a call request from a calling user seeking to establish a call with a called user in the network, to determine whether the call should be routed via the inter-machine trunk, and if so then to:
    (i) select one of the virtual connections of the inter-machine trunk to carry the call through the cell-based network;
    (ii) select a time slot of each of a pair of the time-division-multiplexed signals to carry the call between the telephony interface card and the uplink card within the switch;
    (iii) establish a connection on the uplink card between the selected virtual connection and the selected time slot of one of the time-division-multiplexed signals, and establish a connection on the telephony interface card between the selected time slot of the other of the time-division-multiplexed signals and the telephony interface of the calling user; and
    (iv) forward a call request message to the other switch, the call request message identifying the called user and the virtual connection selected to carry the call.

26. A switch according to claim 25, wherein the call request message forwarded to the second switch identifies the called user by including the telephone number of the called user, and identifies the virtual connection selected to carry the call by included a trunk circuit identifier code (TCIC).

27. A switch according to claim 25, wherein:
each virtual connection includes a plurality of cell slots respectively allocable for carrying different calls through the cell-based network;
selecting a virtual connection includes selecting a cell slot of the selected virtual connection to carry the call between the calling and called users, the selected cell slot being identified in the call request message forwarded from the first switch to the second switch; and
establishing a connection between the selected virtual connection and the selected time slot on the uplink interface card includes establishing a connection between the selected cell slot and the selected time slot.

28. A switch according to claim 27, wherein the call request message forwarded from the first switch to the second switch identifies the selected cell slot by including a trunk circuit identifier code (TCIC).

29. A switch according to claim 25, wherein establishing the inter-machine trunk comprises repeatedly executing an inter-switch signaling process initiated by the first switch, each instance of the signaling process resulting in the establishment of a respective virtual connection of the inter-machine trunk.

30. A switch according to claim 25, wherein the provisioning information identifies a type for the virtual connections of the inter-machine trunk, the type being selected from a group consisting of permanent virtual connections and switched virtual connections, and wherein the inter-machine trunk is established such that the virtual connections are of the identified type.

31. A switch according to claim 25, wherein the provisioning information identifies a type for the inter-machine trunk, the type being selected from a group consisting of a pre-established inter-machine trunk and an on-demand inter-machine trunk, and wherein the inter-machine trunk is established prior to the receipt of the call request if the pre-established inter-machine trunk type is identified, and the inter-machine trunk is established in response to the receipt of the call request if the on-demand inter-machine trunk type is identified.

32. A switch according to claim 31, wherein the provisioning information identifies a type for the virtual connections of the pre-established inter-machine trunk, the type being selected from a group consisting of permanent virtual connections and switched virtual connections, and wherein the virtual connections of the on-demand inter-machine trunk do not include permanent virtual connections, and wherein the inter-machine trunk is established such that the virtual connections are of the identified type.

33. A switch according to claim 31, wherein the call processor and uplink interface card are further operative to tear down the on-demand inter-machine trunk upon satisfaction of a predetermined inactivity criterion.

34. A switch according to claim 33, wherein the predetermined inactivity criterion is the passage of a predetermined time period after the number of calls carried by the inter-machine trunk has fallen to zero.

35. A switch according to claim 25, wherein the call request message is forwarded from the first switch to the second switch over an out-of-band signaling network.

36. A switch according to claim 25, wherein selecting one of the virtual connections comprises selecting a trunk circuit identifier code uniquely identifying the selected virtual connection in the inter-machine trunk, and wherein the call request message forwarded to the other switch includes the selected trunk circuit identifier code to identify the virtual connection to be used for the call.

37. A switch according to claim 25, wherein the call processor is further operative to (i) retrieve an entry from a call routing table upon receipt of the call request, the entry being identified by a subset of the digits of the telephone number of the called user and containing an identifier of the inter-machine trunk as the trunk on which the call should be routed, and (ii) determine whether the call is to be routed on the cell-based network by examining the retrieved call routing table entry.

38. A switch for use in a communications network including a cell-based network, comprising:
a call processor;
a telephony interface card having a plurality of telephony interfaces to respective users; and
an uplink interface card having an interface to the cell-based network, the uplink interface card being configurably connected to the telephony interface card via a plurality of time-division-multiplexed signals, each time-division-multiplexed signal being divided into a corresponding plurality of time slots separately allocable for carrying different calls between the telephony interface card and the uplink card;
wherein:
(1) the call processor and uplink interface cards are cooperatively operative to establish an inter-machine trunk to another switch through the cell-based network, the inter-machine trunk including a plurality of virtual connections each including a plurality of cell slots respectively allocable for carrying different calls, the number of virtual connections and cell slots in the inter-machine trunk being established based on provisioning information generated by an operator communicatively coupled to the switch; and
(2) the call processor, uplink interface card and telephony interface card are cooperatively operative, upon the receipt at the telephony interface card of a call request from a calling user seeking to establish a call with a called user in the network, to determine whether the call should be routed via the inter-machine trunk, and if so then to:
(i) select one of the virtual connections of the inter-machine trunk and a cell slot of the selected virtual connection to carry the call through the cell-based network;
(ii) select a time slot of each of a pair of the time-division-multiplexed signals to carry the call between the telephony interface card and the uplink card within the switch;
(iii) establish a connection on the uplink card between the selected virtual connection and cell slot and the selected time slot of one of the time-division-multiplexed signals, and establish a connection on the telephony interface card between the selected time slot of the other of the time-division-multiplexed signals and the telephony interface of the calling user; and
(iv) forward a call request message to the other switch, the call request message identifying the called user and the virtual connection and cell slot selected to carry the call.

39. A method according to claim 38 wherein the call request message forwarded to the second switch identifies the called user by including the telephone number of the called user, and identifies the virtual connection and cell slot selected to carry the call by included a trunk circuit identifier code (TCIC).

40. A switch according to claim 38, wherein the number of different calls that can be carried by the cell slots of each virtual connection is variable, and wherein establishing the inter-machine trunk includes configuring the virtual connections to carry a number of calls specified by the provisioning information generated by the network operator.

41. A switch according to claim 40, wherein the number of different calls to be carried by each virtual connection is equal to a latency mitigation factor included in the provisioning information for the inter-machine trunk.

42. A switch according to claim 41, wherein the latency mitigation factor can take on any of a set of integer values including the value "1".

43. A switch according to claim 38, wherein the number of different telephony interface circuits for which each virtual connection carries calls is a selectable value between one and a predetermined maximum number greater than one, and wherein each cell of each virtual connection is sent through the cell-based network only upon becoming filled with samples from all telephony interface circuits for which the virtual connection carries calls.

44. A switch according to claim 38, wherein the uplink interface card is operative to perform an adaptation function as part of the connection established between the selected time slot and the selected virtual circuit and cell slot, the adaptation function employing a data structure having data units that do not map one-to-one with data units of a cell, such that the location of a cell slot for a given call in each cell varies in a cyclical pattern over a predetermined number of cells.

45. A switch according to claim 38, wherein the time slots of the time-division-multiplexed are uniquely identified by a set of logical handles, and wherein selecting time slots for the call comprises selecting logical handles from the set of logical handles, each selected logical handle identifying a corresponding time slot to be used for the call.

* * * * *

UNITED STATES PATENT AND TRADEMARK OFFICE
CERTIFICATE OF CORRECTION

PATENT NO.    : 6,363,074 B1
DATED         : March 26, 2002
INVENTOR(S)   : Richard Schmidt et al.

It is certified that error appears in the above-identified patent and that said Letters Patent is hereby corrected as shown below:

Title page,
Item [57], ABSTRACT,
Line 2, "witches" should read -- switches --;

Column 7,
Line 14, "Interface" should read -- Interface --; and

Column 13,
Line 31, first column, "ISUP_TCJC" should read -- ISUP_TCIC --.

Signed and Sealed this

Twentieth Day of January, 2004

JON W. DUDAS
*Acting Director of the United States Patent and Trademark Office*